(12) United States Patent
Achiwa

(10) Patent No.: US 11,223,743 B2
(45) Date of Patent: Jan. 11, 2022

(54) IMAGE PROCESSING SYSTEM, IMAGE PROCESSING APPARATUS, METHOD OF CONTROLLING THE IMAGE PROCESSING APPARATUS, AND STORAGE MEDIUM

(71) Applicant: CANON KABUSHIKI KAISHA, Tokyo (JP)

(72) Inventor: Ken Achiwa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/918,414

(22) Filed: Jul. 1, 2020

(65) Prior Publication Data
US 2021/0014381 A1 Jan. 14, 2021

(30) Foreign Application Priority Data
Jul. 9, 2019 (JP) .............................. JP2019-127890

(51) Int. Cl.
*H04N 1/40* (2006.01)
*G06K 9/46* (2006.01)
(Continued)

(52) U.S. Cl.
CPC ................. *H04N 1/40* (2013.01); *G06K 9/46* (2013.01); *H04N 1/00005* (2013.01);
(Continued)

(58) Field of Classification Search
CPC ........ H04N 1/40; H04N 1/04; H04N 1/00244; H04N 1/00005; H04N 1/00114; H04N 1/0009; H04N 1/00209; H04N 1/4092; H04N 2201/0094; H04N 1/00204; H04N 2201/0039; H04N 1/00411; H04N 2201/3226; H04N 1/0044; H04N 1/00843;
(Continued)

(56) References Cited

U.S. PATENT DOCUMENTS 5,896,403 A * 4/1999 Nagasaki ........... H04N 1/32144
714/752
8,483,495 B2 * 7/2013 Nakagami .............. H04N 19/42
382/238
(Continued)

FOREIGN PATENT DOCUMENTS

JP 2018042067 A 3/2018

*Primary Examiner* — Negussie Worku
(74) *Attorney, Agent, or Firm* — Carter, DeLuca & Farrell LLP

(57) ABSTRACT

An image processing system comprises a first image processing apparatus and a second image processing apparatus. The first image processing apparatus obtains image data and transmits, to the second image processing apparatus, the obtained image data and information relating to the image data. The second image processing apparatus receives the image data and sets a condition for determining whether the image data is the image data to be processed, and determines whether or not the received image data is the image data to be processed, based on the set condition and the information. The second image processing apparatus executes, when it is determined that the received image data is the image data to be processed, image processing on the image data, based on the information and stores a result of the execution of the image processing.

16 Claims, 15 Drawing Sheets

(51) Int. Cl.
  *H04N 1/04* (2006.01)
  *H04N 1/00* (2006.01)

(52) U.S. Cl.
  CPC ....... *H04N 1/0009* (2013.01); *H04N 1/00114* (2013.01); *H04N 1/00209* (2013.01); *H04N 1/00244* (2013.01); *H04N 1/04* (2013.01); *G06K 2209/01* (2013.01)

(58) Field of Classification Search
  CPC ............ H04N 1/2166; H04N 1/00344; H04N 1/00912; H04N 1/00018; H04N 1/00034; H04N 1/00307; H04N 1/00323; H04N 1/00482; H04N 1/00708; H04N 1/00726; H04N 1/00862; H04N 1/00877; H04N 1/00973; H04N 1/2187; H04N 1/32112; H04N 1/32122; H04N 1/3935; H04N 1/40068; H04N 1/6002; H04N 1/6033; H04N 2201/0075; H04N 2201/0081; H04N 2201/323; H04N 2201/3249; H04N 1/0001; H04N 1/00021; H04N 1/00037; H04N 1/00092; H04N 1/00458; H04N 1/00466; H04N 1/32502; H04N 1/54; H04N 2201/325; H04N 1/00023; H04N 1/00045; H04N 1/00087; H04N 1/00408; H04N 1/00413; H04N 1/00421; H04N 1/00427; H04N 1/00517; H04N 1/00734; H04N 1/00819; H04N 1/00864; H04N 1/00875; H04N 1/00885; H04N 1/00891; H04N 1/00904; H04N 1/00915; H04N 1/00965; H04N 1/02825; H04N 1/233; H04N 1/2361; H04N 1/2369; H04N 1/2376; H04N 1/29; H04N 1/295; H04N 1/32406; H04N 1/32486; H04N 1/32529; H04N 1/3255; H04N 1/32561; H04N 1/40037; H04N 1/4005; H04N 1/40062; H04N 1/4058; H04N 1/41; H04N 1/413; H04N 1/506; H04N 1/56; H04N 1/6008; H04N 1/6027; H04N 1/6044; H04N 1/6075; H04N 2201/0015; H04N 2201/0044; H04N 2201/006; H04N 2201/0062; H04N 2201/0082; H04N 2201/0091; H04N 2201/0416; H04N 2201/3202; H04N 2201/3205; H04N 2201/3214; H04N 2201/3233; H04N 2201/3236; H04N 2201/3238; H04N 2201/3273; H04N 2201/3274; H04N 19/119; H04N 19/137; H04N 19/167; H04N 19/176; H04N 19/527; H04N 19/54; H04N 19/543; H04N 1/00132; H04N 1/00167; H04N 1/00188; H04N 1/00278; H04N 1/00347; H04N 1/00514; H04N 1/00854; H04N 1/00896; H04N 1/00954; H04N 1/2158; H04N 1/2307; H04N 1/32128; H04N 1/32545; H04N 1/58; H04N 1/6086; H04N 2101/00; H04N 2201/0041; H04N 2201/0043; H04N 2201/0049; H04N 2201/3242; H04N 2201/3252; H04N 2201/3257; H04N 2201/3259; H04N 2201/3277; H04N 5/225; G06K 9/46; G06K 2209/01; G06K 15/00; G06K 15/129; G06K 15/1836; G06K 15/1851; G06K 15/1871; G06K 2215/0011; G06K 2215/0082; G06K 9/00456; G06K 9/44; G06K 9/4671; G06K 15/40; G06F 16/51; G06F 3/1285; G06F 16/583; G06F 2203/04105; G06F 3/0488; G06F 3/1205; G06F 3/1253; G06F 3/1292; G06F 9/451; G06F 16/29; G06F 21/44; G06F 21/608; G06F 3/0416; G06F 3/04815; G06F 3/1203; G06F 3/1213; G06F 3/1222; G06F 3/1238; G06F 3/1257; G06F 3/126; G06F 3/1265; G06F 3/1267; G06F 3/1288; G06F 16/211; G06F 3/1207; G06F 3/1208; G06F 3/1219; G06F 3/1221; G06F 3/1229; G06F 3/1231; G06F 3/1232; G06F 3/1256; G06F 3/1259; G06F 9/4411; G06F 9/445; G06F 9/505; G09G 2230/00; G09G 2310/0221; G09G 2310/027; G09G 2310/0286; G09G 2310/0291; G09G 2310/0294; G09G 2320/0247; G09G 2320/0252; G09G 2320/0673; G09G 2330/021; G09G 3/3233; G09G 3/3291; G09G 3/3666; G09G 3/3688
  USPC ...................................................... 358/1.15
  See application file for complete search history.

(56) References Cited

U.S. PATENT DOCUMENTS

| | | | |
|---|---|---|---|
| 8,531,724 B2* | 9/2013 | Iinuma | G03G 15/502 358/1.9 |
| 10,542,207 B2* | 1/2020 | Ikenishi | H04N 5/23229 |
| 2017/0155799 A1* | 6/2017 | Achiwa | H04N 1/41 |
| 2018/0013924 A1* | 1/2018 | Komatsu | H04N 1/6075 |
| 2018/0182059 A1* | 6/2018 | Achiwa | H04N 1/46 |
| 2018/0288262 A1* | 10/2018 | Yamada | H04N 1/00244 |
| 2019/0244399 A1* | 8/2019 | Li | G01R 33/5611 |
| 2020/0053257 A1* | 2/2020 | Sreepathihalli | H04N 5/2226 |

* cited by examiner

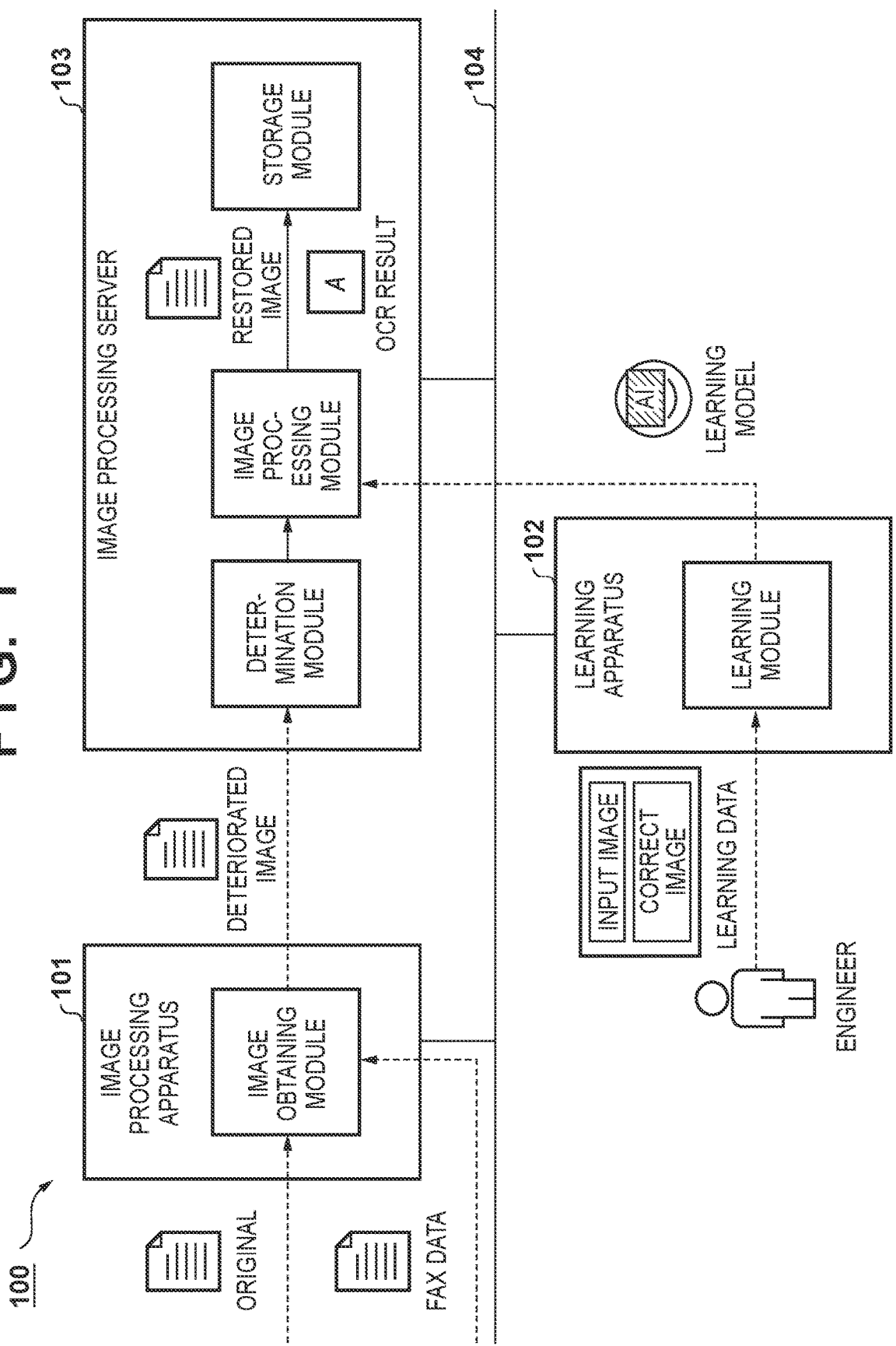

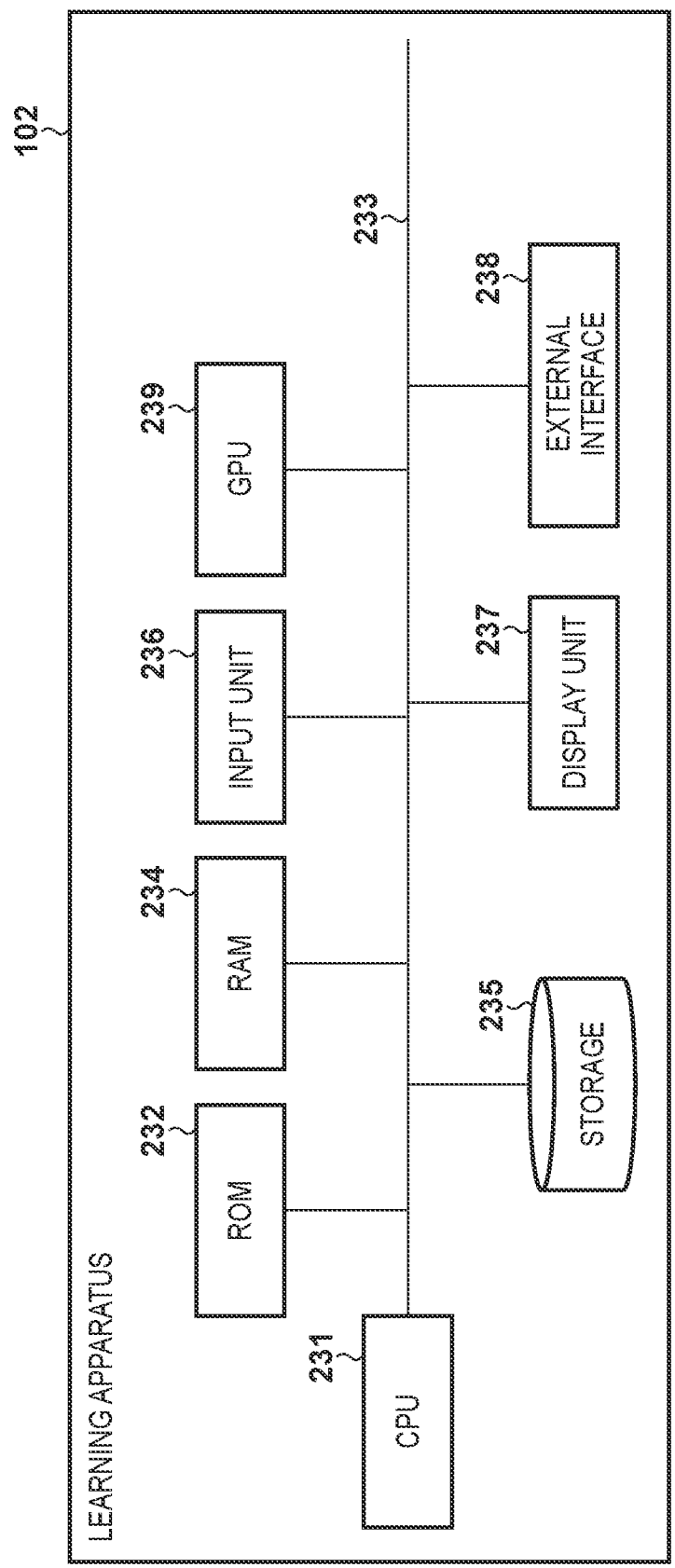

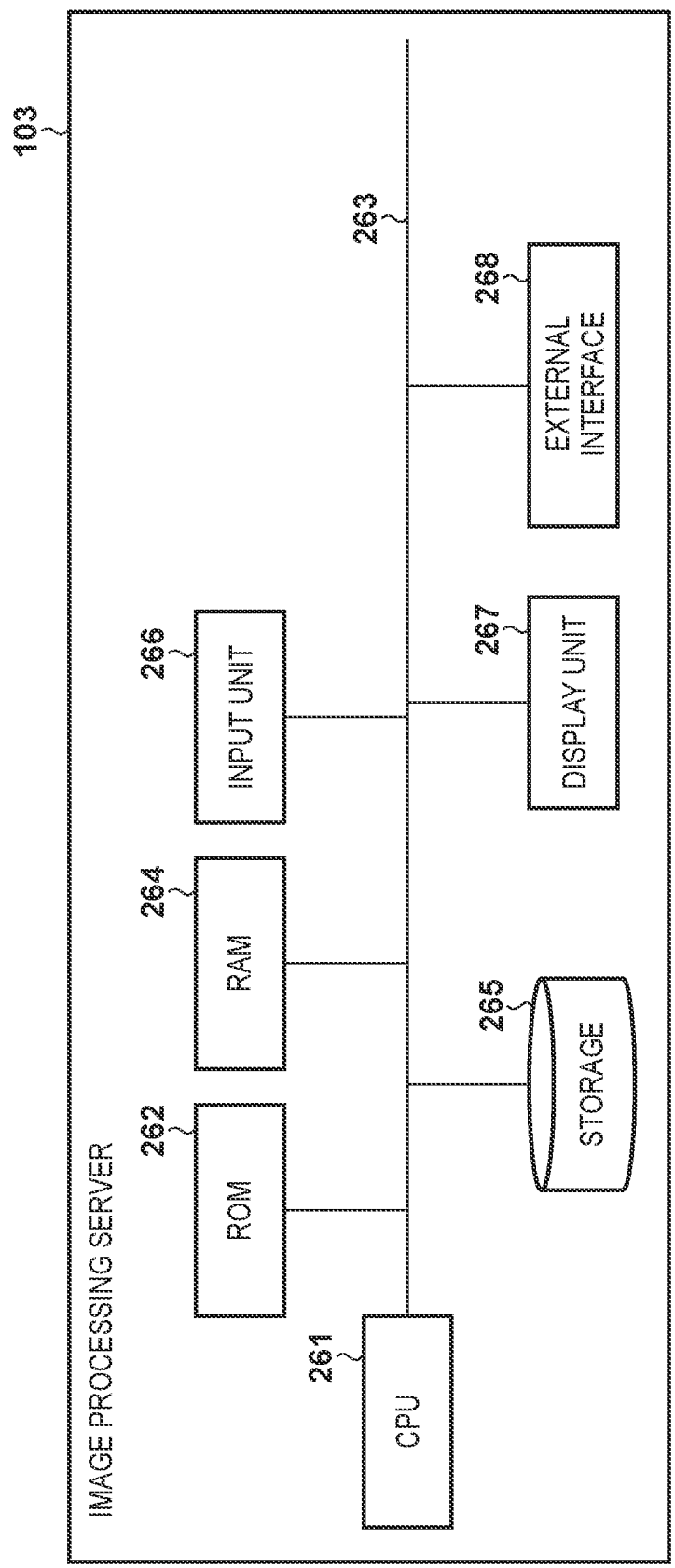

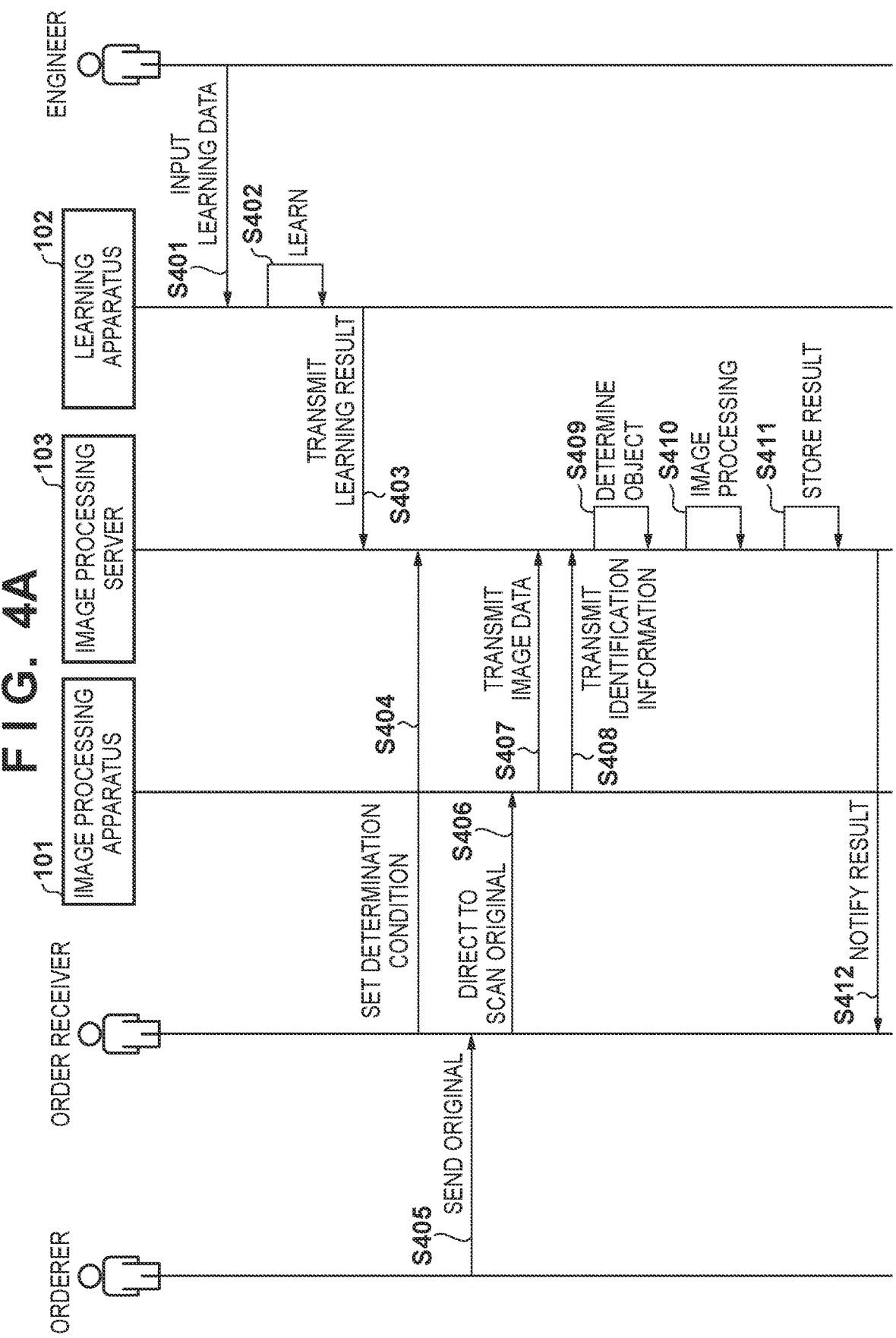

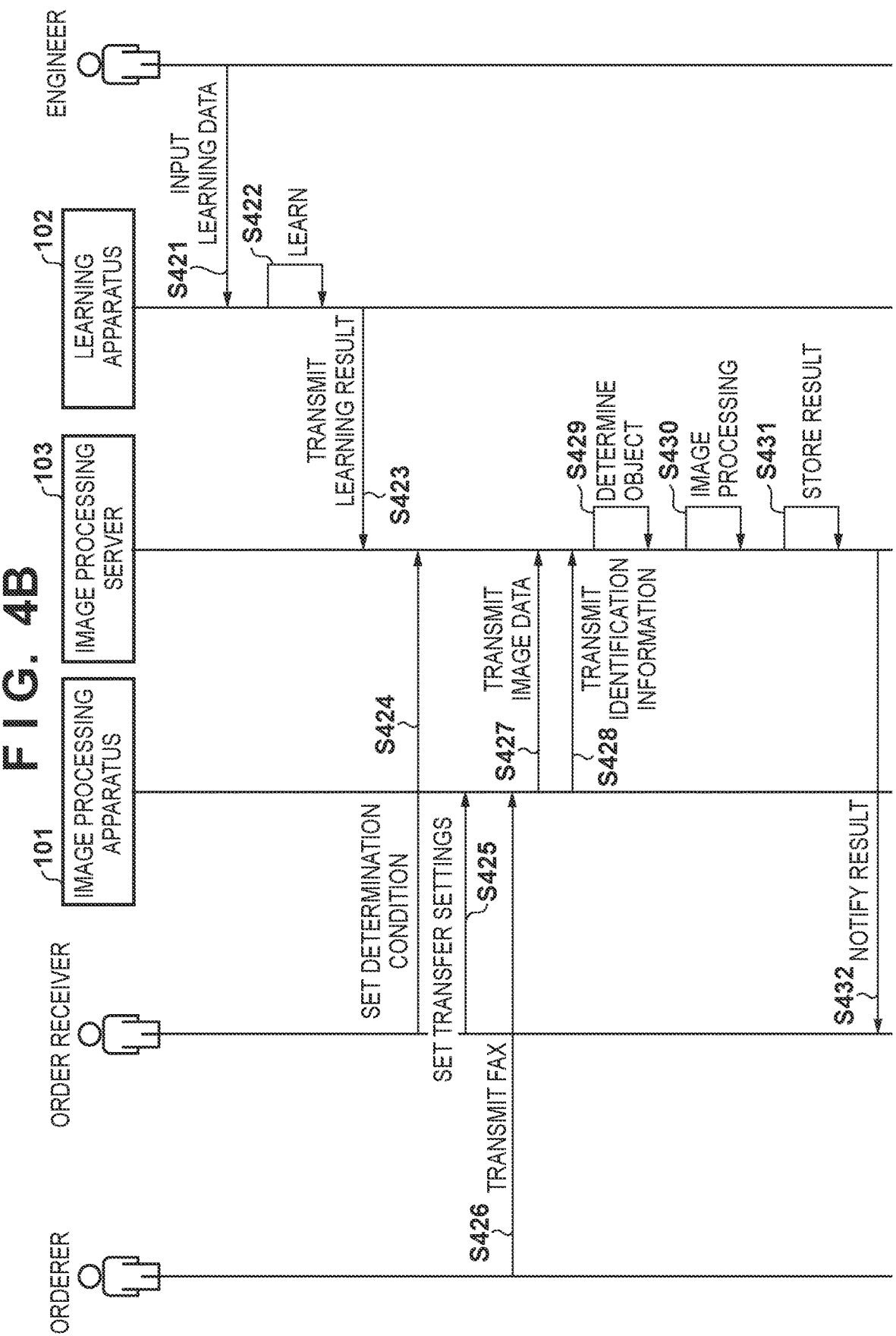

FIG. 10

ISSUANCE DATE:MAY 16, 2019

ORDER SHEET

□□ INC.

○○ INC.

I ORDER AS FOLLOWING.

〒150-0011
△△△, SHIBUYA-KU, TOKYO
03-XXXX-XXXX

ORDER SHEET NUMBER : 12054

| CODE | PRODUCT NAME | QUANTITY | UNIT PRICE | MONEY AMOUNT |
|---|---|---|---|---|
| 2032 | PART A | 200 | 450 | 90,000 |
| 5521 | PART B | 20 | 120 | 2,400 |
| 3294 | PART C | 30 | 150 | 4,500 |
|  |  |  |  |  |
|  |  |  |  |  |
|  |  |  | TOTAL | 96,900 |

FIG. 11A

IMAGE OUTPUT SETTING
- ● OUTPUT IMAGE
  - ☑ GENERATE AND OUTPUT RESTORED IMAGE
  - ☐ OUTPUT RECEIVED IMAGE
- ○ DO NOT OUTPUT IMAGE

FIG. 11B

IMAGE OUTPUT SETTING
- ● OUTPUT IMAGE
  - ☐ GENERATE AND OUTPUT RESTORED IMAGE
  - ☑ OUTPUT RECEIVED IMAGE
- ○ DO NOT OUTPUT IMAGE

FIG. 11C

IMAGE OUTPUT SETTING
- ○ OUTPUT IMAGE
  - ☐ GENERATE AND OUTPUT RESTORED IMAGE
  - ☐ OUTPUT RECEIVED IMAGE
- ● DO NOT OUTPUT IMAGE

FIG. 11D

OCR OUTPUT SETTING
- ● OUTPUT OCR
  - ☑ PERFORM OCR USING RESTORED IMAGE
  - ☐ PERFORM OCR USING RECEIVED IMAGE
- ○ DO NOT OUTPUT OCR

FIG. 11E

OCR OUTPUT SETTING
- ● OUTPUT OCR
  - ☐ PERFORM OCR USING RESTORED IMAGE
  - ☑ PERFORM OCR USING RECEIVED IMAGE
- ○ DO NOT OUTPUT OCR

FIG. 11F

OCR OUTPUT SETTING
- ○ OUTPUT OCR
  - ☐ PERFORM OCR USING RESTORED IMAGE
  - ☐ PERFORM OCR USING RECEIVED IMAGE
- ● DO NOT OUTPUT OCR

FIG. 12A

| | SAMPLE 1 | | SAMPLE 2 | |
|---|---|---|---|---|
| | INPUT IMAGE | CORRECT IMAGE | INPUT IMAGE | CORRECT IMAGE |
| IMAGE | 電 | 電 | 驚 | 驚 |

FIG. 12B

| | SAMPLE 1 | | SAMPLE 2 | |
|---|---|---|---|---|
| | DETERIORATED IMAGE | RESTORED IMAGE | DETERIORATED IMAGE | RESTORED IMAGE |
| IMAGE | 源 | 源 | D | D |
| EXTRACTED TEXT (OCR) | 瀧 | 源 | O | D |

IMAGE PROCESSING SYSTEM, IMAGE PROCESSING APPARATUS, METHOD OF CONTROLLING THE IMAGE PROCESSING APPARATUS, AND STORAGE MEDIUM

BACKGROUND OF THE INVENTION

Field of the Invention

The present invention relates to an image processing system, an image processing apparatus, and a method of controlling the image processing apparatus, and a storage medium.

Description of the Related Art

In the related art, in order to quickly and reliably transmit necessary information, organizations such as companies engaged in order placement and receiving business and application examination business use bills document such as an estimation sheet, order sheet, and application form, and transmit them by mail, e-mail, FAX (facsimile), or the like. Among them, communication networks of FAX have been established in many countries and regions, and immediacy and certainty of FAX are higher than other communication method for information, so that FAX is widely used as a useful communication method for information.

In general, a person in charge of a company that performs such a task needs to input information described in bills document into a predetermined work system provided by the company. At this time, a person in charge manually inputs necessary data while visually checking the contents of predetermined items included in the bills document. In recent years, in order to improve the efficiency of data input, an effort has been made to apply OCR processing (character recognition processing) to document image data obtained by FAX or scan, and then to automatically input the resulting character string data to a work system. Further, there is known a technique of preliminarily selecting document image data to be processed in order to make the OCR processing itself more efficient. Japanese Patent Laid-Open No. 2018-42067 describes a technique in which only document image data of a specific document subject to be recognized by a first device is transmitted to a second device, and the second device applies OCR processing on the document image data of the specific document to improve the OCR processing efficiency.

However, in the technique described in Japanese Patent Laid-Open No. 2018-42067, a transmitting apparatus selects and transmits a specific document in advance, and a receiving apparatus performs common image processing for all received document image data. For this reason, the receiving apparatus sometimes performs both necessary image processing and unnecessary image processing on the received document image data. That is, for example, the document image data obtained by the transmitting apparatus has different deterioration factors such as a decrease in resolution and compression noise. However, the receiving apparatus cannot determine whether the image data needs to be restored to correct such factors, and thus has performed the common image processing without considering the necessity.

In a system in which a plurality of transmitting apparatuses (MFP) and a single device (server) are connected, the plurality of transmitting apparatuses may include a device that cannot select the specific document. In such a case, the receiving server cannot determine whether it is necessary to extract specific information from the information received from the plurality of devices, so that common image processing will be executed.

SUMMARY OF THE INVENTION

An aspect of the present invention is to eliminate the above-mentioned problem with conventional technology.

A feature of the present invention is to provide a technique that can efficiently execute image processing on image data in a receiving apparatus.

According to a first aspect of the present invention, there is provided an image processing system, comprising: a first image processing apparatus; and a second image processing apparatus, wherein the first image processing apparatus includes at least one first processor and at least one first memory configured to function as: an obtaining unit that obtains image data; and a transmitting unit that transmits, to the second image processing apparatus, the image data obtained by the obtaining unit and information relating to the image data, and the second image processing apparatus includes at least one second processor and at least one second memory configured to function as: a receiving unit that receives the image data; a first setting unit that sets a condition for determining whether the image data is the image data to be processed; a determining unit that determines whether or not the received image data is the image data to be processed, based on the condition and the information; an executing unit that executes, when the determining unit determines that the received image data is the image data to be processed, image processing on the image data, based on the information; and a storing unit that stores a result of the execution of the image processing by the executing unit.

According to a second aspect of the present invention, there is provided an image processing apparatus, comprising: at least one processor and at least one memory configured to function as: an obtaining unit that obtains image data; a setting unit that sets a condition for determining whether the image data is the image data to be processed; a determining unit that determines whether the image data obtained by the obtaining unit is the image data to be processed, based on the condition and information associated with the image data; an executing unit that executes, when the determining unit determines that the received image data is the image data to be processed, image processing on the image data, based on the information; and a storing unit that stores the result of the execution of the image processing by the executing unit.

According to a third aspect of the present invention, there is provided a method of controlling an image processing apparatus, the method comprising: obtaining image data; setting a condition for determining whether the image data is the image data to be processed; determining whether the obtained image data is the image data to be processed, based on the condition and information associated with the image data; executing, when the obtained image data is determined to be the image data to be processed, image processing on the image data, based on the information; and storing a result of the execution of the image processing.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a diagram illustrating a configuration example of an image processing system according to a first exemplary embodiment of the present invention.

FIG. 2B is a block diagram for explaining an example of a hardware configuration of a learning apparatus according to the first exemplary embodiment.

FIG. 2C is a block diagram for explaining an example of a hardware configuration of an image processing server according to the first exemplary embodiment.

FIGS. 4A and 4B are diagrams for explaining a use sequence of the image processing system according to the first exemplary embodiment.

FIG. 10 is a diagram illustrating an example of an image of an order sheet.

FIGS. 11A to 11F are diagrams each illustrating an example of setting screens in S404 of FIG. 4A or S424 of FIG. 4B for setting the necessity of image processing for image restoration and information extraction given to the image processing server from the order receiver (user).

FIG. 12A is a diagram illustrating an example of an input image (deteriorated image) and an original image (correct image).

FIG. 12B is a diagram illustrating an example of a deteriorated image and a restored image.

DESCRIPTION OF THE EMBODIMENTS

Figure 2A:
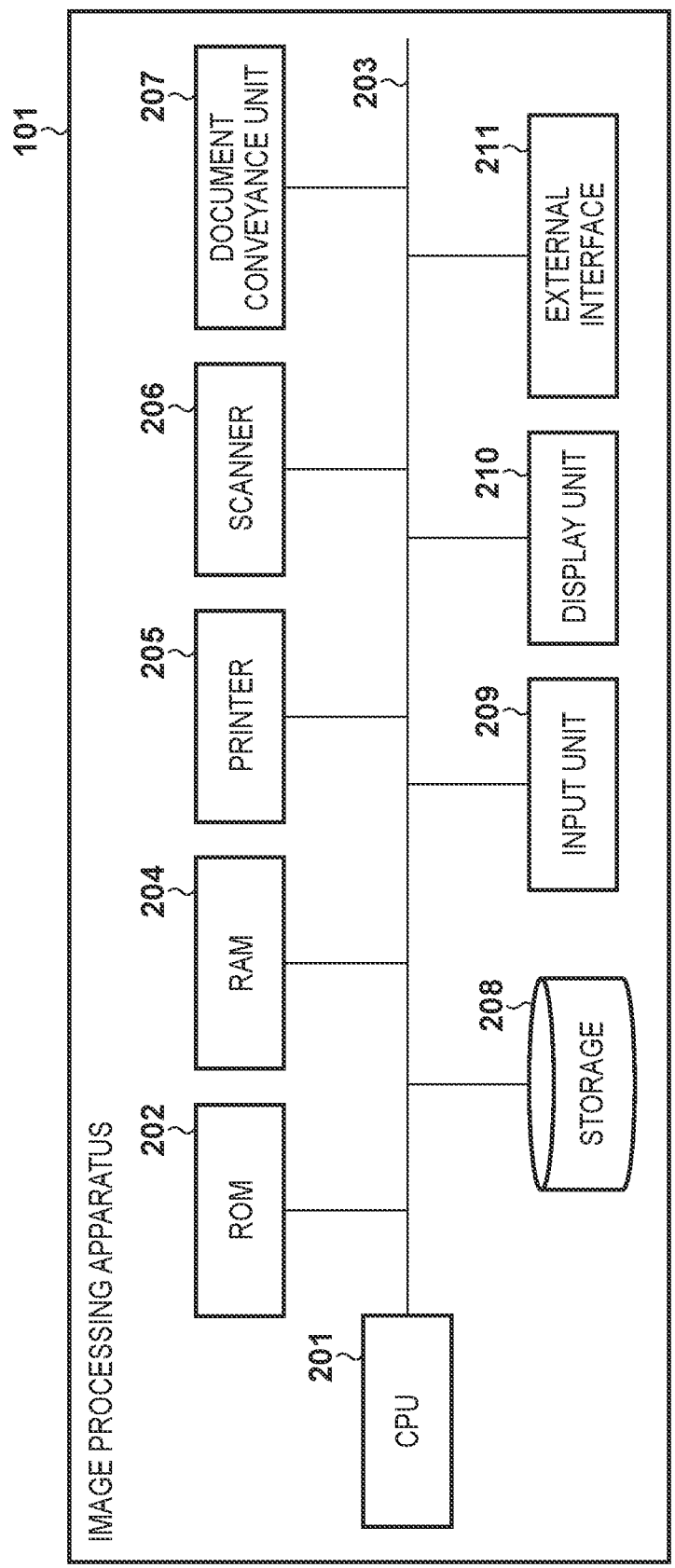
FIG. 2A is a block diagram for explaining an example of a hardware configuration of an image processing apparatus according to the first exemplary embodiment.

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Also, a plurality of features may be arbitrarily combined.

First Exemplary Embodiment

FIG. 1 is a diagram illustrating a configuration example of an image processing system 100 according to the first exemplary embodiment of the present invention.

The image processing system 100 includes an image processing apparatus 101, a learning apparatus 102, and an image processing server 103, which are connected to each other via a network 104. Here, the image processing apparatus 101 and the image processing server 103 may have a configuration in which a plurality, instead of one, of them are connected to the network 104. Specifically, for example, the image processing apparatus 101 may have a configuration in which each of a plurality of image processing apparatuses is connected to a single image processing server 103 via the network 104. Further, for example, the image processing server 103 may have a configuration in which a high speed operation resource and a large-capacity storage of the image processing server 103 are independent of each other, and a first server including the high speed operation resource and a second server including the large-capacity storage are connected. The learning apparatus 102 may be required when the image processing by the image processing server 103 is image processing based on learning, and not necessarily included in the image processing system 100. That is, in the first exemplary embodiment of the present invention, the image processing executed by the image processing server 103 may be image processing based on an algorithm of the related art rather than image processing based on learning.

The image processing apparatus 101 is implemented by an MFP (multifunction peripheral) or the like that can implement a plurality of functions such as printing, scanning, and FAX. The image processing apparatus 101 functions as an image obtaining module. The image obtaining module transmits, to the image processing server 103, document image data obtained by performing predetermined image processing on image data obtained by scanning an original such as a form. Further, the image obtaining module transmits, to the image processing server 103, document image data obtained by performing predetermined image processing on FAX data transmitted from a FAX apparatus (not illustrated) by scanning an original such as a form. Here, the document image data transmitted from the image processing apparatus 101 to the image processing server 103 is usually data subjected to lossy conversion such as image compression of JPEG, resolution conversion, and binarization, for the purpose of reducing the amount of communication data, and therefore is referred to as a deteriorated image.

The learning apparatus 102 executes learning of a learning model for restoring the deteriorated image so as to approximate the original image (original image data), such as compressed image noise removal, resolution increasing, and multi-level conversion. The learning apparatus 102 functions as a learning module for generating a learning result (parameters of the neural network, or the like). The learning apparatus 102 generates a learning result by learning using learning data which is a pair of input image data and correct image data provided by an engineer, for example. The learning apparatus 102 transmits the generated learning result to the image processing server 103 via the network 104.

The image processing server 103 includes a determining module configured to determine whether the deteriorated image data received from the image processing apparatus 101 is the image data to be processed, for example, according to a determination condition for selecting a form to be stored in the work system. Then, it functions as an image processing module configured to restore the deteriorated image data determined by the determining module to be processed, or to extract character information included in the document image data by OCR processing. The image processing server 103 uses the learning result generated by the learning apparatus 102 to perform image restoration by a neural network on the deteriorated image data, and obtains reconstructed image data. One of machine learning methods using neural networks is deep learning using a multilayer neural network. Here, the image processing server 103 performs OCR processing on the reconstructed image data obtained by conversion, and obtains text data recognized as a character as a result. Further, the image processing server 103 stores the generated reconstructed image data and the text data obtained by the character recognition in the large-capacity storage.

The network 104 is implemented by a LAN, a public line (WAN), or the like, and is used to connect the image processing apparatus 101, the learning apparatus 102, and the image processing server 103 to each other and transmits and receives data among the apparatuses.

FIGS. 2A to 2C are block diagrams for each explaining an example of hardware configurations of the image processing apparatus 101, the learning apparatus 102, and the image processing server 103 according to the first exemplary embodiment.

FIG. 2A is a block diagram for explaining an example of the hardware configuration of the image processing apparatus 101 according to the first exemplary embodiment.

The image processing apparatus 101 includes a CPU 201, a ROM 202, a RAM 204, a printer 205, a scanner 206, a document conveyance unit 207, a storage 208, an input unit 209, a display unit 210, an external interface 211, or the like, which are connected via a bus 203. The CPU 201 functions as a control unit configured to control the entire operation of the image processing apparatus 101, and the CPU 201 executes a boot program stored in the ROM 202 and deploys the control program stored in the storage 208 into the RAM 204 to be executed. Thus, the CPU 201 implements functions such as printing, scanning, and FAX of the image processing apparatus 101. The ROM 202 is a nonvolatile memory that cannot be rewritten and stores the boot program or the like for starting the image processing apparatus 101. The bus 203 transmits and receives control signals and data to and from devices constituting the image processing apparatus 101. The RAM 204 is implemented by a volatile memory, and is used as a deployment area of a control program executed by the CPU 201 and as a work memory when executing the control program.

The printer 205 prints an image on a recording medium (sheet) based on the image data. The scanner 206 optically reads a recording medium (sheet) on which characters, diagrams, photographs, or the like are printed, and obtains image data thereof. The document conveyance unit 207 is implemented by an ADF (automatic document feeder) or the like, detects the original such as a form placed on a document table, and conveys the detected original one by one to the scanner 206. The storage 208 is, for example, an HDD (hard disk drive) or the like, and stores the above-described control program and image data. The input unit 209 includes a touch panel, hardware keys, or the like, and receives an operation to the image processing apparatus 101 from a user. The display unit 210 displays setting screens of the image processing apparatus 101 to the user. Note that the display unit 210 may be integrated with the touch panel of the input unit 209. The external interface 211 connects the image processing apparatus 101 and the network 104, receives FAX data from a FAX apparatus (not illustrated), and transmits the document image data to the image processing server 103.

FIG. 2B is a block diagram for explaining an example of the hardware configuration of the learning apparatus 102 according to the first exemplary embodiment.

The learning apparatus 102 includes a CPU 231, a ROM 232, a RAM 234, a storage 235, an input unit 236, a display unit 237, an external interface 238, and a GPU (Graphics Processing Unit) 239. These are connected to each other via a bus 233. The CPU 231 is a control unit configured to control the entire operation of the learning apparatus 102. The CPU 231 executes a boot program stored in the ROM 232, deploys a learning program stored in the storage 235 into the RAM 234, and learns a neural network to restore image data executing the program. The ROM 232 stores the boot program for starting the learning apparatus 102. The bus 233 transmits and receives data to and from devices constituting the learning apparatus 102. The RAM 234 provides a memory for the CPU 231 to deploy the learning program and a work memory for the CPU 231 to execute the learning program. The storage 235 is implemented by an HDD (hard disk drive) or the like, and stores the above-described learning program and learning data. The input unit 236 includes a pointing device, a keyboard, or the like, and receives an operation to the learning apparatus 102 from an engineer. The display unit 237 is used to present setting screens of the learning apparatus 102 to the engineer. The external interface 238 connects the learning apparatus 102 and the network 104, and receives learning data from a terminal apparatus such as a PC (not illustrated), or transmits a learning model to the image processing server 103. The GPU 239 is an arithmetic unit including an image processing processor. The GPU 239 executes an arithmetic operation for updating the parameters constituting the learning model based on the given learning data, for example, based on the control information by the CPU 231.

FIG. 2C is a block diagram for explaining an example of the hardware configuration of the image processing server 103 according to the first exemplary embodiment.

The image processing server 103 includes a CPU 261, a ROM 262, a RAM 264, a storage 265, an input unit 266, a display unit 267, and an external interface 268, which are connected to each other via a bus 263. The CPU 261 is a control unit configured to control the entire operation of the image processing server 103. The CPU 261 executes a boot program stored in the ROM 262, deploys an image processing program stored in the storage 265 into the RAM 264, and executes the program to selectively execute image processing for restoring image data or extracting information. The ROM 262 stores the boot program for starting the image processing server 103. The bus 263 transmits and receives data, control signals, or the like between devices constituting the image processing server 103. The RAM 264 provides a deployment area for the image processing program executed by the CPU 261 and a work memory when executing the image processing program. The storage 265 is implemented by an HDD (hard disk drive) or the like, and stores the above-described image processing program and learning model. The input unit 266 includes a pointing device, a keyboard, or the like, and receives an operation to the image processing server 103 from a user. The display unit 267 is used to present setting screens of the image processing server 103 to the user. The external interface 268 connects the image processing server 103 and the network 104, and receives a learning model from the learning apparatus 102 and document image data from the image processing apparatus 101.

FIGS. 4A and 4B are diagrams for explaining the use sequence of the image processing system according to the first exemplary embodiment. Here, a case will be described in which, when a form such as an order sheet is sent from an orderer to an order receiver in an order placement and receiving business, the order receiver (user) stores image data of the form and text information included in the image data into the work system (image processing server 103).

FIG. 4A is a diagram for explaining an example in which, when an original form such as an order sheet is sent from an orderer to an order receiver by mail, the order receiver scans the original form and stores the result.

In S401, an engineer of the manufacturer providing the image processing system 100 inputs the learning data in order to cause the learning apparatus 102 to perform learning of an image restoration model. The learning apparatus 102 uses the input learning data to execute learning of the neural network in S402. Details of the learning model update will be described later with reference to FIG. 6. When the learning is completed, the learning apparatus 102 transmits the learning result to the image processing server 103 in S403. These steps are performed in advance before the steps described later.

Next, in S404, the order receiver sets one or more conditions from among a device ID, a user ID, a date and time, a time zone, a fixed form, or the like in advance as the determination conditions for selecting the form to be stored in the work system. In this way, for example, a device ID of the image processing apparatus 101 and a user ID of the person in charge, which are available for the department in charge, are registered in advance in the company of the order receiver. Thus, even when the forms are handled in a plurality of different works, the forms handled in the specific order placement and receiving business can be selected and stored in the work system. Further, for example, by registering in advance the date and time of normal business operation in the company of the order receiver, only the forms correctly processed for receiving orders during business hours can be selected and stored in the work system. Further, for example, a fixed form such as an order sheet to be used in an order placement and receiving business is registered in advance in the company of the order receiver. Thus, only a form such as an order sheet made in a fixed form registered in a form DB and recognizable as a form can be selected and stored in the work system.

After the initial setting is completed, the order receiver thus receives the original form sent by the orderer by mail or the like in S405. In S406, the order receiver directs the image processing apparatus 101 to scan the received original form and to transmit the result to the image processing server 103.

Thus, in S407, the image processing apparatus 101 transmits, to the image processing server 103, the image data obtained by scanning the original in accordance with the order receiver direction. Further, in S408, the image processing apparatus 101 transmits, to the image processing server 103, identification information at the time of obtaining the image data during scanning of the original.

Next, in S409, the image processing server 103 determines whether the received image data is the image data to be processed according to the determination condition given in S404. Details of the determination as to whether the image data is the image data to be processed will be described later with reference to FIG. 7. Next, in S410, the image processing server 103 selectively performs image processing for image data restoration or information extraction by using the learning model given in S403 with respect to the image data determined as the image data to be processed. Details of the image processing control will be described later with reference to FIG. 8. Next, in S411, as the result of the image processing in S410, the image processing server 103 stores, in a predetermined storage area of the image processing server 103, the reconstructed image data as the result of the restoration of the generated image data, and the extracted text as the result of the information extraction. Finally, in S412, the image processing server 103 notifies the order receiver of the completion of the processing. Additionally, the notification method used herein may be, for example, a method of displaying a notification of a processing completion job when the order receiver refers to the display unit 237 of the image processing server 103. Alternatively, for example, the notification of the processing completion job may be transmitted to the mail address or the message account of the logged-in user who has directed scanning of the original in S406.

FIG. 4B is a diagram for explaining an example in which, when FAX is transmitted from the FAX apparatus of the orderer to the image processing apparatus 101 of the order receiver (user), the image processing apparatus 101 transfers and stores the FAX data to the work system (image processing server 103).

S421 to S423 in FIG. 4B are completely the same as S401 to S403 in FIG. 4A, so that a description thereof will be omitted. Next, in S424, the order receiver sets, in advance, one or more of the following determination conditions for selecting a form to be stored in the work system, that is, a source FAX number (facsimile number), a destination FAX number, an IP address, a port number, a date and time, a time zone, a fixed form, or the like. Thus, for example, by registering in advance the source FAX number of the orderer of a customer and the destination FAX number dedicated to a specific order receipt business in the order receiver's company, the forms handled in the specific order placement and receiving business can be selected and stored in the work system even when the forms are handled in a plurality of different works. Further, for example, by registering in advance the IP address and the port number of the image processing apparatus 101 available for the department in charge in the company of the order receiver, even when the forms are handled by a plurality of different works, the forms handled in the specific order placement and receiving business can be selected and stored in the work system. Further, by registering in advance the date and time of normal business operation in the company of the order receiver, only the forms correctly processed for receiving order in the business hours can be selected and stored in the work system. Further, for example, by registering a fixed form such as an order sheet to be used in an order placement and receiving business in advance in the company of the order receiver, only a form such as an order sheet made in a fixed form registered in a form DB and recognizable as a form can be selected and stored in the work system.

Next, in S425, the order receiver sets the image data at the time of FAX reception to be transferred to the work system (image processing server 103) designated in advance.

In S426, the FAX apparatus of the orderer transmits FAX data to the image processing apparatus 101 of the order receiver (user). Thus, the image processing apparatus 101 transfers the FAX data to the image processing server 103 in accordance with the transfer setting given in S425. Subsequent S427 to S432 in FIG. 4B are identical to S407 to S412 in FIG. 4A, so that a description thereof will be omitted.

Figure 3:
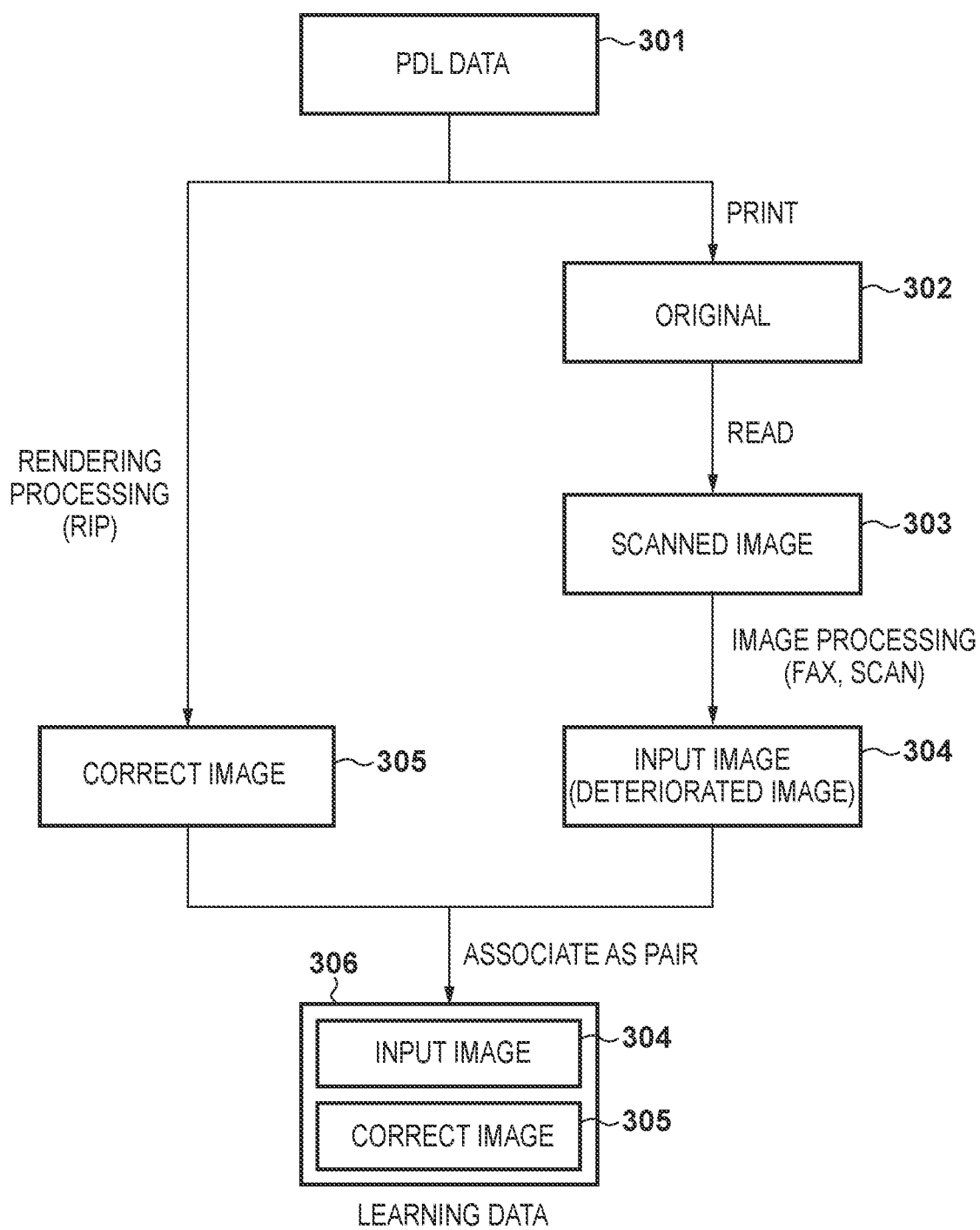
FIG. 3 is a diagram for explaining a formation of learning data according to the first exemplary embodiment of the present invention.

FIG. 3 is a diagram for explaining a formation of the learning data according to the first exemplary embodiment of the present invention. Here, referring to FIG. 3, the learning data input to the learning apparatus 102 by the engineer in S401 of FIG. 4A and S421 of FIG. 4B will be described.

The learning data is data used by the learning apparatus 102 to learn a neural network in a learning module. To learn a neural network, pairs of data before and after conversion are required as learning data. Specifically, for example, data before conversion (input image=deteriorated image) that is low-grade image data after FAX or scanning and data after conversion (correct image) that is high-grade image data before printing an original are prepared as learning data. The learning data is used for learning for restoring the deteriorated image to the correct image. That is, for example, when a FAX is assumed, as illustrated in sample 1 and sample 2 illustrated in FIG. 12A, a large number of pairs of an input image as a deteriorated image and a correct image as an original image are prepared as learning data.

FIG. 12A illustrates an example of an input image (deteriorated image) and an original image (correct image).

As illustrated in FIG. 3, the learning data 306 is data composed of a pair of a correct image 305 and an input image 304. Here, the correct image 305 is generated as a result of rendering processing (RIP) of the PDL data 301 at a predetermined resolution. On the other hand, the input image 304 is generated by reading the original 302, on which the PDL data 301 is printed by the printer, with the scanner to generate a scanned image 303, and then applying predetermined image processing to the scanned image 303.

Specifically, for example, in order to reproduce a deteriorated image at the time of FAX transmission and reception, FAX image processing such as resolution conversion and binarization is performed to generate the input image 304. More specifically, in order to reproduce, for example, a deteriorated image at the time of scan transmission, scanned image processing such as image correction in accordance with the characteristics of the scanner or image compression of JPEG or the like is performed to generate the input image 304. Here, it is desirable that the device used in the step of generating image data under the development environment of the engineer has the same characteristics as the printer 205 and the scanner 206 of the image processing apparatus 101. As the scanned image 303, instead of the image data obtained by actually operating the printer 205 or the scanner 206, image data generated by simulation for simulating printing and scanning may be used. Further, in order to restore high-grade image data, it is necessary to learn the neural network using a large amount of learning data. Here, it is assumed that the learning is performed under a condition in which sufficient learning data is given in advance.

Figure 6:
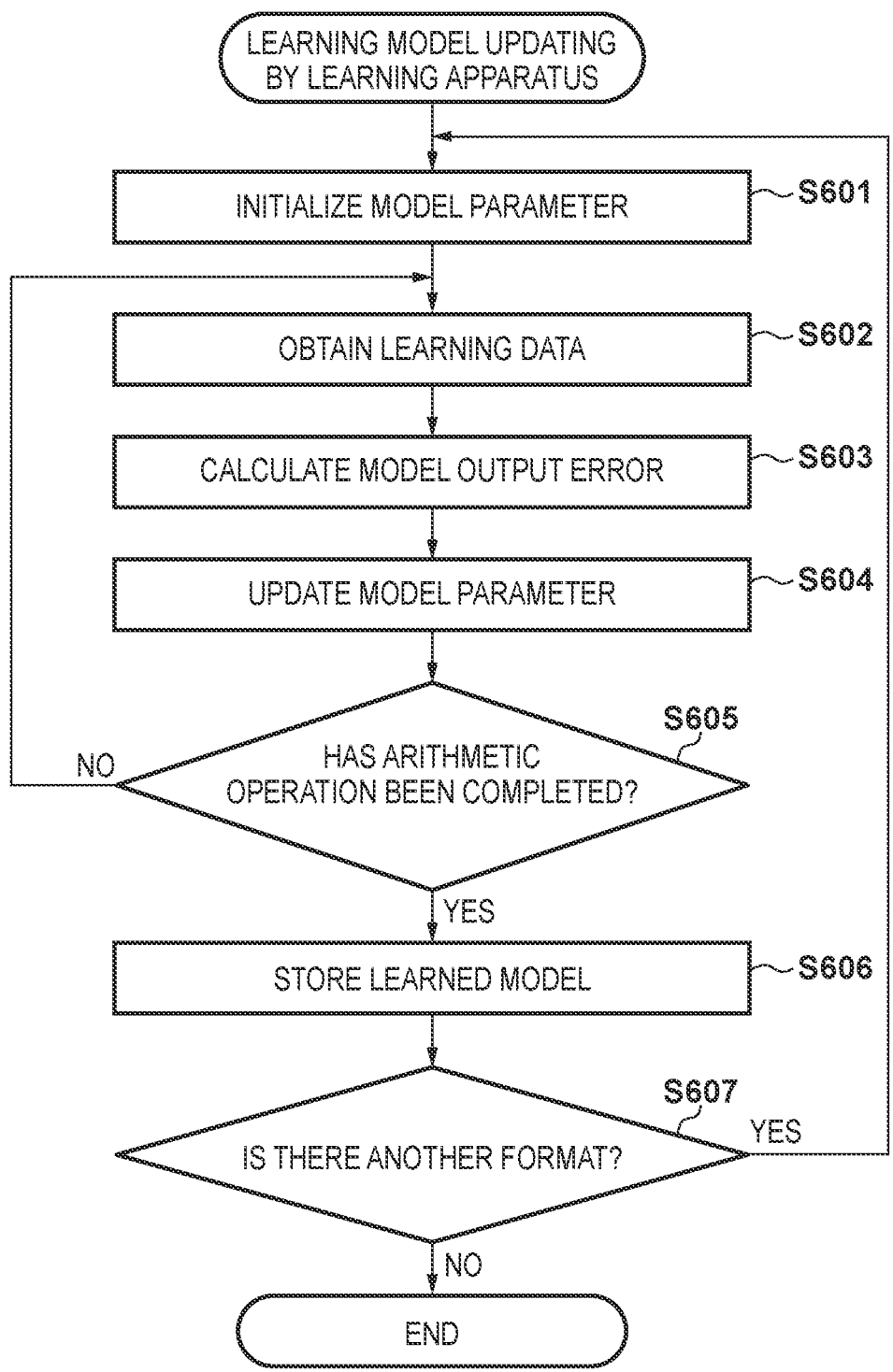
FIG. 6 is a flowchart for explaining a flow of learning processing of a learning model by the learning apparatus in S402 of FIG. 4A and S422 of FIG. 4B.

FIG. 6 is a flowchart for explaining a flow of the learning processing of the learning model by the learning apparatus 102 in S402 and S422 of FIGS. 4A and 4B. Moreover, the process described in FIG. 6 is achieved by the CPU 231 of the learning apparatus 102 deploying a program stored in either the ROM 232 or the storage 235 into the RAM 234 and executing the deployed program.

First, in step S601, the CPU 231 initializes the value of the weight parameter constituting the neural network used as the learning model by using the GPU 239. That is, the CPU 231 sets, for example, a weight parameter constituting the neural network to a random value, or loads and resets a previously learned value. Next, the process proceeds to step S602, where the CPU 231 uses the GPU 239 to obtain, as learning data, a pair of an input image and a correct image that match in the conditions of the resolution, the gradation, and the compression method (including a different compression ratio) among the learning data input in S401 and S421 of FIGS. 4A and 4B. Next, the process proceeds to step S603, where the CPU 231 controls the GPU 239 to execute an arithmetic operation, with respect to the neural network initialized in step S601, for calculating an error of a pixel value between the output image when the input image is input and the correct image paired with the input image. Next, the process proceeds to step S604, where the CPU 231 controls the GPU 239 to execute an arithmetic operation for updating the value of the weight parameter of the learning model, which is generally called a back propagation method. Then, the process proceeds to step S605, where the CPU 231 uses the GPU 239 to determine whether the arithmetic operation has been completed by a predetermined number of learning times by using a predetermined number of learning data. Here, if the CPU 231 determines that the predetermined number of learning times by using the predetermined number of learning data has been completed, the process proceeds to step S606. If the CPU 231 does not determine as above, the arithmetic operations of step S602 to step S604 are repeated.

In step S606, the CPU 231 uses the GPU 239 to store the value of the weight parameter constituting the neural network of the learned model in a storage module such as the storage 235. The learned model obtained in step S606 is formed as an image processing module that can convert, for example, an input image scanned and transmitted at a low resolution into a correct image of a high resolution equivalent to an original, including an unknown image, instead of simply replacing the image with an existing image.

Specifically, for example, the learned model repeatedly executes steps S602 to S604 to learn the difference tendency between the input image and the correct image, thereby obtaining an image restoration method for removing an isolated point in image data generated by reading noise during scanning of the original. More specifically, for example, the learned model obtains an image restoration method for suppressing and smoothing the wobble of the edge portion of the drawing object in the image data generated by the resolution decreasing or the binarization. By using the learned model provided with the thus obtained image restoration method, for example, the deteriorated images illustrated in sample 1 and sample 2 in FIG. 12B can be each restored to the images illustrated as the restored images.

FIG. 12B is a diagram illustrating an example of a deteriorated image and a restored image.

Next, in step S607, the CPU 231 determines whether to update the learning model by using the learning data in another data format. When it is determined that the learning model is to be updated using the learning data in another data format, the processing advances to step S601, and the CPU 231 repeats the processing from step S601 to step S606. On the other hand, when it is determined that the learning model is not updated by using the learning data in another data format, the learning model updating process is terminated.

Here, the another data format is one in which, for example, correct images and input images generated under conditions of different resolutions (examples: 600×600 dpi, 300×300 dpi, and 200×100 dpi) are paired and learned as learning data. Further, the another data format to be generated is, for example, correct images and input images generated under conditions of different gradations (16 bit gradation=65536 colors, 8 bit gradation=256 colors, 1 bit gradation=2 colors). The another data format to be generated may cover combinations of pairs of correct images and input images so that all data formats receivable by the image processing apparatus 101 can be converted into data formats satisfying conditions recommended by the OCR engine.

Figure 5:
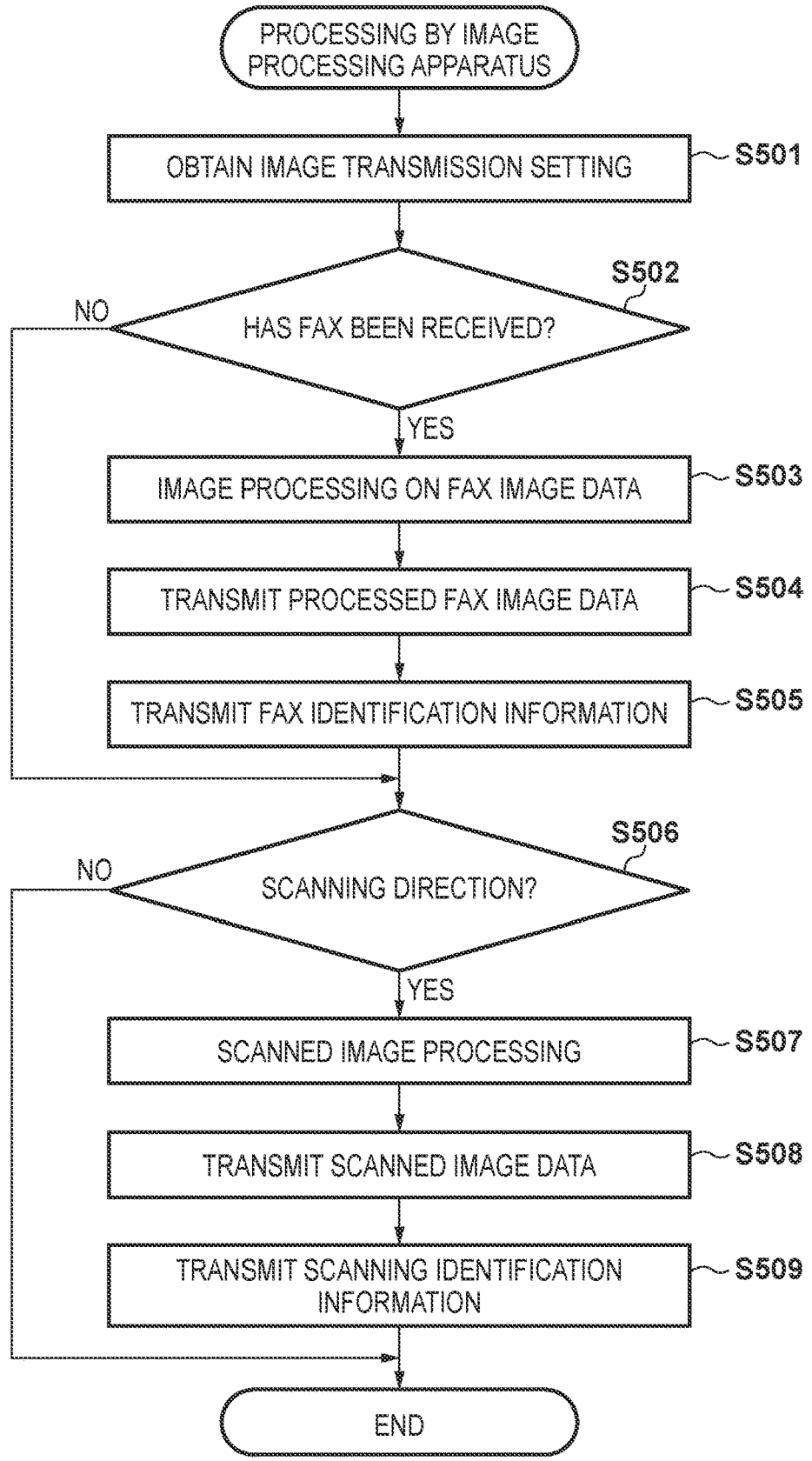
FIG. 5 is a flowchart for explaining data transmission processing from the image processing apparatus to the image processing server in S407 and S408 of FIG. 4A and S427 and S428 of FIG. 4B.

FIG. 5 is a flowchart for explaining a data transmission processing from the image processing apparatus 101 to the image processing server 103 in S407 and S408 of FIG. 4A, and S427 and S428 of FIG. 4B. The process described in FIG. 5 is achieved by deploying a program stored in the ROM 202 or the storage 208 of the image processing apparatus 101 into the RAM 204, then executing the deployed program by the CPU 201.

First, in step S501, the CPU 201 obtains the image transmission setting information set in S406 and S425 of FIGS. 4A and 4B. Specifically, in the scan direction in S406 or the FAX reception transfer setting in S425, a destination address for specifying a storage destination folder in the storage 265 of the image processing server 103 is obtained. Next, the process proceeds to step S502, where the CPU 201 determines whether the image processing apparatus 101 of the order receiver has received the FAX data transmitted from the FAX apparatus of the orderer. Here, when the CPU 201 determines that FAX data has been received, the process proceeds to step S503, and when it determines that FAX data has not been received, the process advances to step S506.

In step S503, the CPU 201 executes image processing on the received FAX data. Specifically, the image processing apparatus 101 applies, to the FAX data, the filters such as executable isolated point removal and smoothing, to generate FAX image data (deteriorated image in FIG. 1) that is corrected according to a predetermined image processing algorithm. Next, the process proceeds to step S504, and the CPU 201 transmits the FAX image data (deteriorated image) generated in step S503 to the image processing server 103. Next, the process proceeds to step S505, and the CPU 201 transmits identification information that can be obtained by the image processing apparatus 101 regarding the FAX job received in step S502 to the image processing server 103 (S428 of FIG. 4).

Specifically, for example, the image processing apparatus 101 transmits identification information such as a source FAX number, a destination FAX number, an IP address, a port number, and a FAX reception date and time, or the like to the image processing server 103. These pieces of identification information are information considered to be usable for identifying whether the document image data is exchanged in a specific order placement and receiving business. Further, the image processing apparatus 101 transmits, to the image processing server 103, identification information that is a condition of a deteriorated image when applying image restoration that can be implemented by the image processing server 103. The identification information includes resolution (examples: 200×100 dpi, 200×200 dpi), a compression method (examples: MR, MMR, JBIG, JPEG), or the like. Then, the processing proceeds to step S506.

In step S506, the CPU 201 determines whether the order receiver has directed scanning of the original using the image processing apparatus 101, as illustrated in S406. Here, when the CPU 201 determines that scanning is directed, the process proceeds to step S507, and when it determines that scanning is not directed, the process terminates. In step S507, the CPU 201 executes image processing on the image data obtained by optically reading the original. Specifically, the image data is corrected based on a predetermined image processing algorithm to generate the corrected image data (the deteriorated image in FIG. 1) by performing image correction according to the characteristics of the scanner 206 or image compression of JPEG or the like that can be executed by the image processing apparatus 101. Next, the process proceeds to step S508, and the CPU 201 transmits, to the image processing server 103, the scanned image data (deteriorated image) generated in step S507. Then, the process proceeds to step S509, and the CPU 201 transmits identification information regarding the executed scan job, which can be obtained by the image processing apparatus 101, to the image processing server 103 (S408 of FIG. 4A).

Specifically, for example, in S408 or S428, the image processing apparatus 101 transmits, to the image processing server 103, identification information such as a device ID, a log-in user ID, and a scan date and time, which are considered to be available for identifying whether the document image data is the document image data to be exchanged in a specific order placement and receiving business. Further, the image processing apparatus 101 transmits, to the image processing server 103, the identification information serving as a condition of the deteriorated image when applying the image restoration that can be implemented by the image processing server 103. The identification information includes a resolution (examples: 300×300 dpi, 150×150 dpi), a compression method (examples: High Compression PDF, JPEG), a gradation (examples: full color, black and white binary), or the like.

Thus, the image processing apparatus 101 can transmit, to the image processing server 103, image data obtained by scanning an original or image data obtained by FAX reception together with information referred to in the image data restoration.

Figure 7:
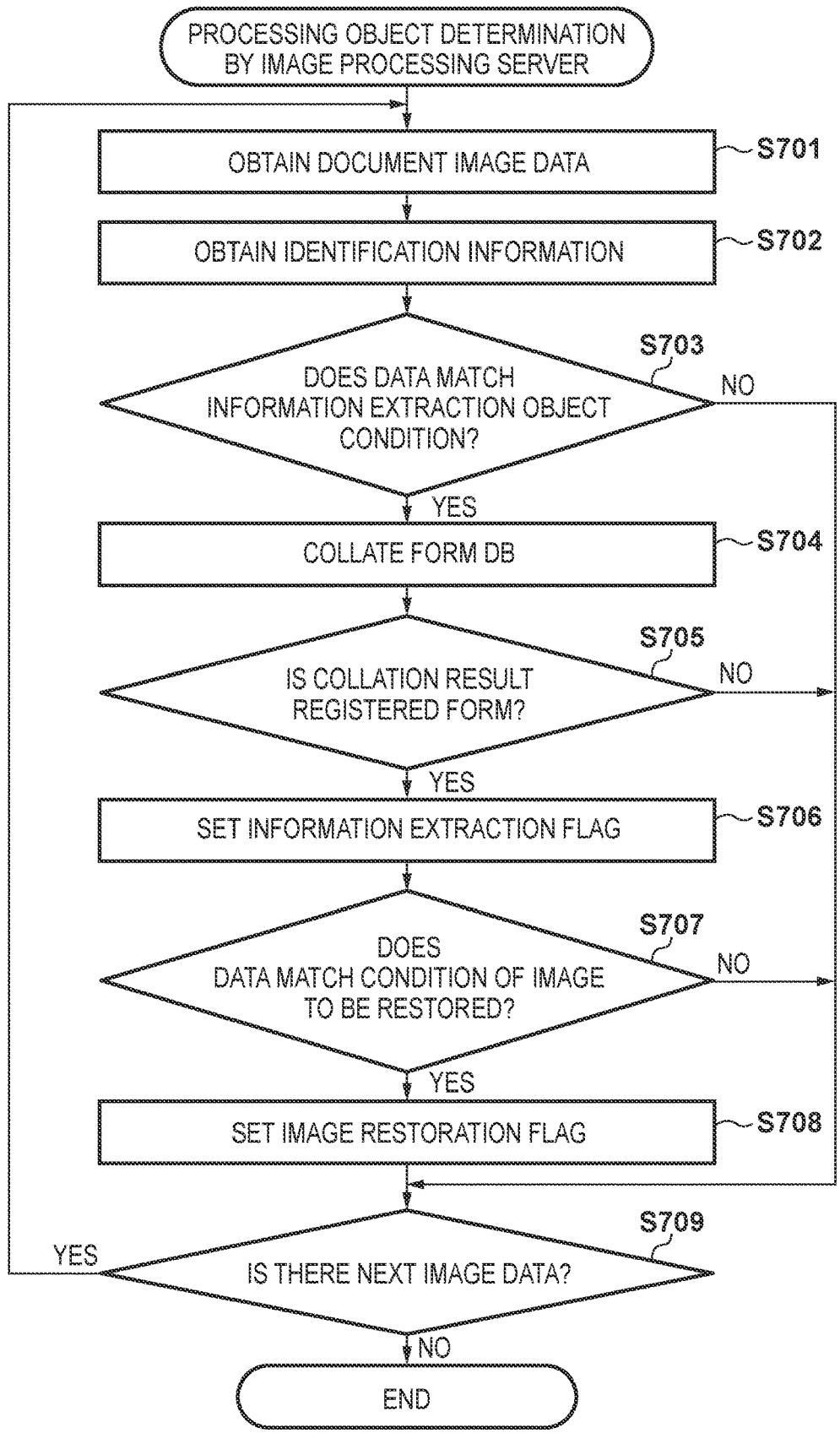
FIG. 7 is a flowchart for explaining determination processing in which the image processing server determines in S409 of FIG. 4A and S429 of FIG. 4B whether image data received from the image processing apparatus is image data to be processed.

FIG. 7 is a flowchart for explaining the determination processing whether the image data received from the image processing apparatus 101 by the image processing server 103 is the image data to be processed in S409 and S429 of FIGS. 4A and 4B. Additionally, the process described in FIG. 7 is implemented by the CPU 261 of the image processing server 103 executing a program stored in the ROM 262 or the storage 265 after deploying the program into the RAM 264.

In step S701, the CPU 261 obtains FAX image data transmitted in step S504 or step S508 of FIG. 5 (alternatively, S407 and S427 of FIG. 4) or document image data that is scanned image data. Next, the process proceeds to step S702, and the CPU 261 obtains identification information associated with the document image data transmitted in steps S505 and S509 of FIG. 5 (alternatively, S408, S428 of FIGS. 4A and 4B). The identification information includes identification information about the job and identification information about the image. That is, when the job is a FAX job, the identification information regarding the job includes a source FAX number, a destination FAX number, an IP address, a port number, a FAX reception date and time, or the like, and when the job is a scan job, includes a device ID, a log-in user ID, a scan execution date and time, or the like. The identification information about the image includes a resolution (examples: 300×300 dpi, 200×100 dpi), a compression method (examples: MR, MMR, JBIG, JPEG, high compression PDF), a gradation (examples: full color, black and white binary), or the like.

Next, the process proceeds to step S703, where the CPU 261 determines whether the document image data having the identification information regarding the job obtained in step S702 matches the condition registered as the information extraction object. Here, when the CPU 261 determines that the condition is met, the process is transitioned into step S704, and when it determines that the condition is not met, the process is transitioned into step S709. Here, the determination as to whether the condition of the information extraction object is met is specifically implemented, for example, by determining whether the source FAX number is included in the registered FAX number list. Alternatively, the determination as to whether the condition of the information extraction object is met is specifically implemented, for example, by determining whether the user who has executed the scan is included in the registered list of persons in charge of work. The above-described example is merely an example, and by setting one or more conditions for narrowing down the specific form desired by the user, the specific form can be effectively selected even with a small number of conditions.

In step S704, the CPU 261 calculates the image feature amount of the image data received from the image processing apparatus 101 in step S701, and executes form recognition based on the similarity with the image feature amount of the form registered in the form DB. Then, the process proceeds to step S705, and the CPU 261 determines whether the collation result obtained in step S704 corresponds to any of the forms registered in the form DB. When it is determined that the form corresponds to any of the forms registered in the form DB, the process proceeds to step S706, and when it is determined that the form does not correspond to any of the forms, the process proceeds to step S709. Note that the form recognition technique used herein can be implemented, for example, by using a known technique identifiable, by pattern matching of predetermined regions of interest such as a ruled line, a frame line, a keyword, a symbol, a mark, and a code. By providing the object determination in step S703 before the form recognition in step S704, it is not necessary to execute the form recognition processing for all the forms, so that the form recognition processing itself can be executed efficiently.

In step S706, the CPU 261 sets an information extraction flag to ON, which is a flag for indicating that the document image data is the information to be extracted, on the document image data determined in step S705 to correspond to the form registered in the form DB. Next, the process proceeds to step S707, where the CPU 261 determines whether the document image data having the identification information obtained in step S702 matches the condition of the deteriorated image to be restored. Here, when the CPU 261 determines that the condition is met, the process proceeds to step S708, and when it determines that the condition is not met, the process proceeds to step S709. In step S708, the CPU 261 sets an image restoration flag to ON, which is a flag for indicating that the document image data is the image to be restored, on the document image data determined in step S707 to match the condition of the deteriorated image to be restored. Then, the process proceeds to step S709 and the CPU 261 determines whether there is next image data for which the process object determination should be executed. When it determines that there is next image data, it repeats executing the above-described steps S701 to S708. On the other hand, when the CPU 261 determines that there is no next image data, this processing is terminated.

As described above, according to this processing, the image processing server 103 determines whether the image data received from the image processing apparatus 101 corresponds to any of the registered forms, and further determines whether the image data determined to correspond to the registered form is an image object to be restored. As described above, by narrowing down the image data registered and to be restored, it is not necessary to execute the process of recognizing the form and determining whether it is the object to be restored for all the image data, so that the processing can be executed efficiently.

Figure 8:
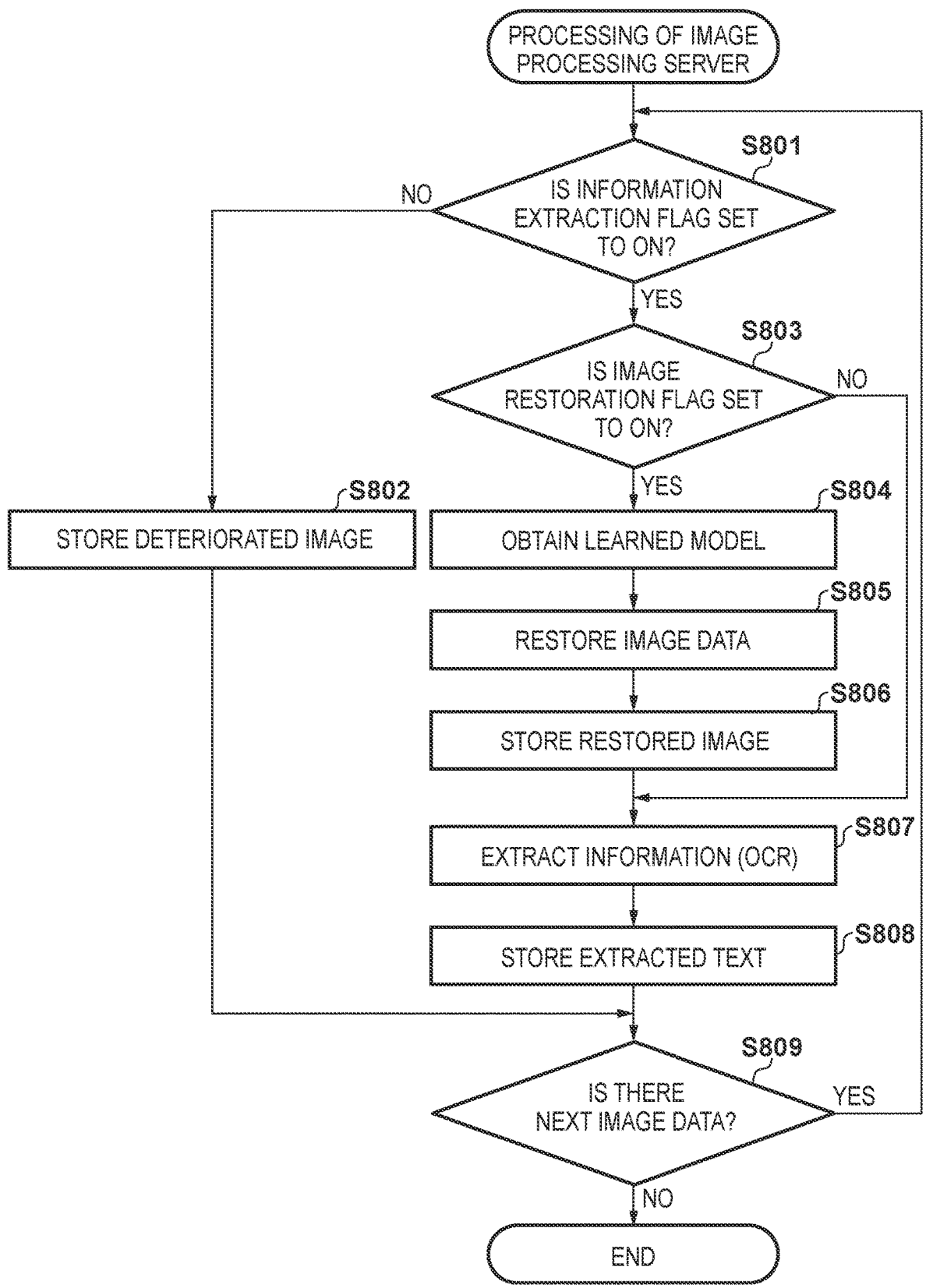
FIG. 8 is a flowchart for explaining a flow of image processing control by the image processing server in S410 of FIG. 4A or S430 of FIG. 4B.

FIG. 8 is a flowchart for explaining the flow of image processing by the image processing server 103 in S410 or S430 of FIGS. 4A and 4B. Additionally, the process illustrated in FIG. 8 is implemented by the CPU 261 of the image processing server 103 executing a program stored in the ROM 262 or the storage 265 after deploying the program into the RAM 264.

This processing is started when the image processing server 103 receives the image data. First, in step S801, the CPU 261 determines whether the information extraction flag is set to ON in step S706 of FIG. 7. Here, when the CPU 261 determines that the information extraction flag is set to ON, the processing proceeds to step S803, and when it determines that the information extraction flag is not set to ON, the processing proceeds to step S802. In step S802, the CPU 261 stores the received image data in the deteriorated image state as it is without performing image restoration or information extraction on the document image data obtained in step S701, and the process advances the processing to step S809.

On the other hand, when it is determined that the information extraction flag is set to ON, the process proceeds to step S803, where the CPU 261 determines whether the image restoration flag is set to ON in step S708 of FIG. 7. When the CPU 261 determines that the image restoration flag is set to ON, the process proceeds to step S804, and when it determines that the image restoration flag is not set to ON, the process proceeds to step S807.

With the object image data thus specified, the process proceeds to step S804, where the CPU 261 selects and obtains a predetermined learned model stored in the image processing server 103 in S403 of FIG. 4A or S423 of FIG. 4B. Here, the selected learned model refers to the identification information regarding the image obtained in step S702 of FIG. 7, that is, conditions of the deteriorated image such as the resolution, the compression method, the gradation, and is a learned model having conditions of the input image that match the conditions of the deteriorated image.

Then, the process proceeds to step S805, and the CPU 261 inputs, to the learned model obtained in step S804, the image data obtained in step S701 as an input image. The image data restored according to the learning model is obtained as the restored image data. That is, for example, when a FAX is assumed, by using a learned model corresponding to the FAX, the deteriorated images illustrated in sample 1 and sample 2 in FIG. 12B are respectively restored and the resulting restored images are obtained. Then, the process proceeds to step S806, and the CPU 261 stores, the restored image obtained in step S805, in the storage module such as the RAM 264 or the storage 265.

Next, in step S807, the CPU 261 executes OCR processing on the deteriorated image as the document image data obtained in step S701 or the restored image restored based on the deteriorated image, extracts item information included in the image data, and outputs the extracted text. That is, for example, the extracted text as the OCR result is output based on the deteriorated images or the restored images illustrated in the samples 1 and 2 in FIG. 12B. Here, for example, while the OCR result for the deteriorated image of "歌 (kanji character notation)" or "D" is erroneously recognized as "歌 (kanji character notation)" or "0," the OCR result for the restored image can be correctly recognized as "歌 (kanji character notation)" or "D". It should be noted that the OCR processing used here may be performed by selecting a processing module according to the type of characters included in the object form, such as the type OCR processing when the form obtained in step S701 and collated in step S704 is a type form or the handwritten OCR processing when the form is a handwritten form.

Then, the process proceeds to step S808, and the CPU 261 stores the extracted text output in step S807 as input data to a predetermined work system. Specifically, for example, as illustrated in FIG. 10, when the value of the extracted text corresponding to each key of "Product Name", "Quantity", and "Unit Price" is respectively "Part A", "200", and "450", the CPU 261 performs the following control. That is, the CPU 261 inputs and stores the respective extracted text values in the input fields of the respective keys of the work system.

FIG. 10 is a diagram illustrating an example of an image of an order sheet.

Next, the process proceeds to step S809, where the CPU 261 determines whether there is next image data to be subjected to image processing control. When the CPU 261 determines that there is next image data, the process proceeds to step S801, and repeatedly executes performing the above-mentioned steps S801 to S808, and when the CPU 261 determines that there is no next image data, the process terminates.

As described above, according to the first exemplary embodiment, the image processing for the received document image data can be efficiently performed by the receiving apparatus. In other words, it is possible to efficiently perform image processing on document image data having deterioration factors such as a decrease in resolution and compression noise after the receiving apparatus determines whether image restoration for correcting these factors is necessary or not.

Even in a system configuration in which a plurality of sender apparatuses (MFP) and a single receiving apparatus (server) are connected, the receiving apparatus determines whether information extraction based on the received image data is necessary, based on identification information received together with the image data. Thus, the image processing for the received image data can be efficiently performed.

In particular, it is assumed that the receiving apparatus (server) provides a function having a large amount of computation and a high added value such as image processing using a neural network. In such a case, according to the first exemplary embodiment, the processing object can be selected even for a large amount of image data, and the processing efficiency for the image data can be improved. For example, the waiting time of a user can be shortened by narrowing down the object to a form workflow in which the user wants to improve the efficiency of work in a receiving apparatus. Further, for example, as in the case of a general cloud service, even when the service usage cost of the receiving apparatus (server) is charged according to the usage time of the calculation resource (CPU, GPU, RAM, or the like), the usage cost can be reduced.

Second Exemplary Embodiment

In the first exemplary embodiment described above, for example, whether to execute image processing for image restoration or information extraction is selectively switched on a form basis. On the other hand, in the second exemplary embodiment, image processing for image restoration and information extraction is executed, for example, by using only a designated area in a document as a processing object. Since the configuration of the image processing system according to the second exemplary embodiment and the hardware configuration of the image processing apparatus 101, the learning apparatus 102, and the image processing server 103 are the same as those of first exemplary embodiment described above, the description thereof is omitted.

FIG. 10 depicts a view illustrating an example of an order sheet as an example of a form, and it is a diagram for explaining an example in which a processing object area, to which image processing of image restoration and information extraction apply on document image data, is limited only to a designated area.

In the above-described first exemplary embodiment, when the image restoration flag is set to ON on a form basis, for example, it is necessary to perform image restoration on an entire page 1000 of the order sheet illustrated in FIG. 10.

On the other hand, in the second exemplary embodiment, the positional coordinates of the designated area, where the image is to be restored and the information is to be extracted, are set in advance in the fixed form which has been recognized as the object form as a result in step S704. That is, for example, in FIG. 10, only the designated areas of the values of contents included in each cell of a company name 1001, an order sheet number 1002, and an order content 1003 are cut out as input images, and image restoration is executed for each of them to generate a restored image.

Thus, the time required for image restoration can be shortened as the area of the image to be processed becomes smaller. Similarly, the OCR processing of the restored image can be shortened in processing time compared with the case of executing the OCR processing of the entire page. This is because, compared with the case where the OCR processing of the entire page is executed, the processing for searching and estimating the character area as OCR object (block selection) is simplified, and the character string itself as OCR object is suppressed to the minimum necessary.

Since the image processing control by the image processing server 103 according to the second exemplary embodiment is implemented in the same flow as that of FIG. 8 according to the first exemplary embodiment described above, the description thereof is omitted. However, when applying the image restoration of step S805 illustrated in FIG. 8, it is only necessary to use an image obtained by cutting out only a designated area in a page from which information is to be extracted as an input image, instead of using the entire page as in the first exemplary embodiment. Also, when applying the information extraction in step S807, it is sufficient to perform OCR processing on the restored image generated from the input image, in step S805, which is the cut out image, instead of the entire page as in the case of the first exemplary embodiment.

As described above, according to the second exemplary embodiment, the image processing of image restoration and information extraction can be performed more efficiently than the case where the image processing is performed on the entire page of the form, by using only the designated area in the form in which the user wants to improve the efficiency of the work as the processing object. That is, in the form workflow in which the user wants to improve the efficiency of the work, the waiting time of the user can be further reduced by not only selecting forms but also limiting the processing area.

Third Exemplary Embodiment

In the image processing control by the image processing server 103 according to the first exemplary embodiment and the second exemplary embodiment described above, the restriction on the form to be processed given by the user is used as the determination condition. On the other hand, in the third exemplary embodiment, the necessity of image processing on the form to be processed given by the user is set as a determination condition. Further, since the configuration of the image processing system according to the third exemplary embodiment and the hardware configuration of the image processing apparatus 101, the learning apparatus 102, and the image processing server 103 are the same as those of first exemplary embodiment described above, the description thereof is omitted.

FIGS. 11A to 11F are diagrams each illustrating an example of setting screens for setting the necessity of image processing for image restoration and information extraction to be given from an order receiver (user) to the image processing server 103 in S404 of FIG. 4A or S424 of FIG. 4B.

Here, these setting screens may be displayed using the display unit 267 of the image processing server 103 or the display unit 210 of the image processing apparatus 101 that can communicate data with the image processing server 103. The operation of the setting change given from the user to these setting screens may be input through the input unit 266 of the image processing server 103 or the input unit 209 of the image processing apparatus 101 that can communicate data with the image processing server 103.

FIGS. 11A to 11C are diagrams each illustrating an example of setting screens for setting the necessity of image processing for image restoration. FIGS. 11D to 11F are diagrams each illustrating an example of screens for performing OCR output setting as an example of information extraction.

FIG. 11A illustrates a setting example of generating and outputting a restored image from an input image (deteriorated image). FIG. 11B illustrates a setting example of outputting the input image as it is without generating the restored image from the input image (deteriorated image). FIG. 11C illustrates a setting example in which neither an input image (deteriorated image) nor a restored image is output. FIG. 11D illustrates a setting example in which a restored image is generated from an input image (deteriorated image) and OCR processing is performed using the restored image. FIG. 11E illustrates a setting example of performing OCR processing using an input image (deteriorated image) without generating a restored image from the input image. FIG. 11F illustrates a setting example in which OCR processing is performed on neither the input image nor the restored image.

For example, if the user wants to input only the extracted text as the OCR result for the restored image, FIGS. 11C and 11D are set. Thus, the image restoration can be executed only for the OCR object area, and the restored image can be discarded without storing it after the OCR processing.

Further, for example, if the user browses only the restored image as the result of restoration and wants to manually input to the work system by the user observing the restored image, FIGS. 11A and 11F are set. Thus, the image processing for obtaining only the restored image can be executed.

For example, if the user wants to store the received image data itself (deteriorated image) which is not processed by image processing such as image restoration, FIGS. 11B and 11F are set. Thus, the received image data itself can be stored. Note that the settings illustrated in FIGS. 11A to 11F may be a configuration that can be set in common for all the transmitted forms, or a configuration that can be set individually for each of the forms registered as a fixed form.

Figure 9:
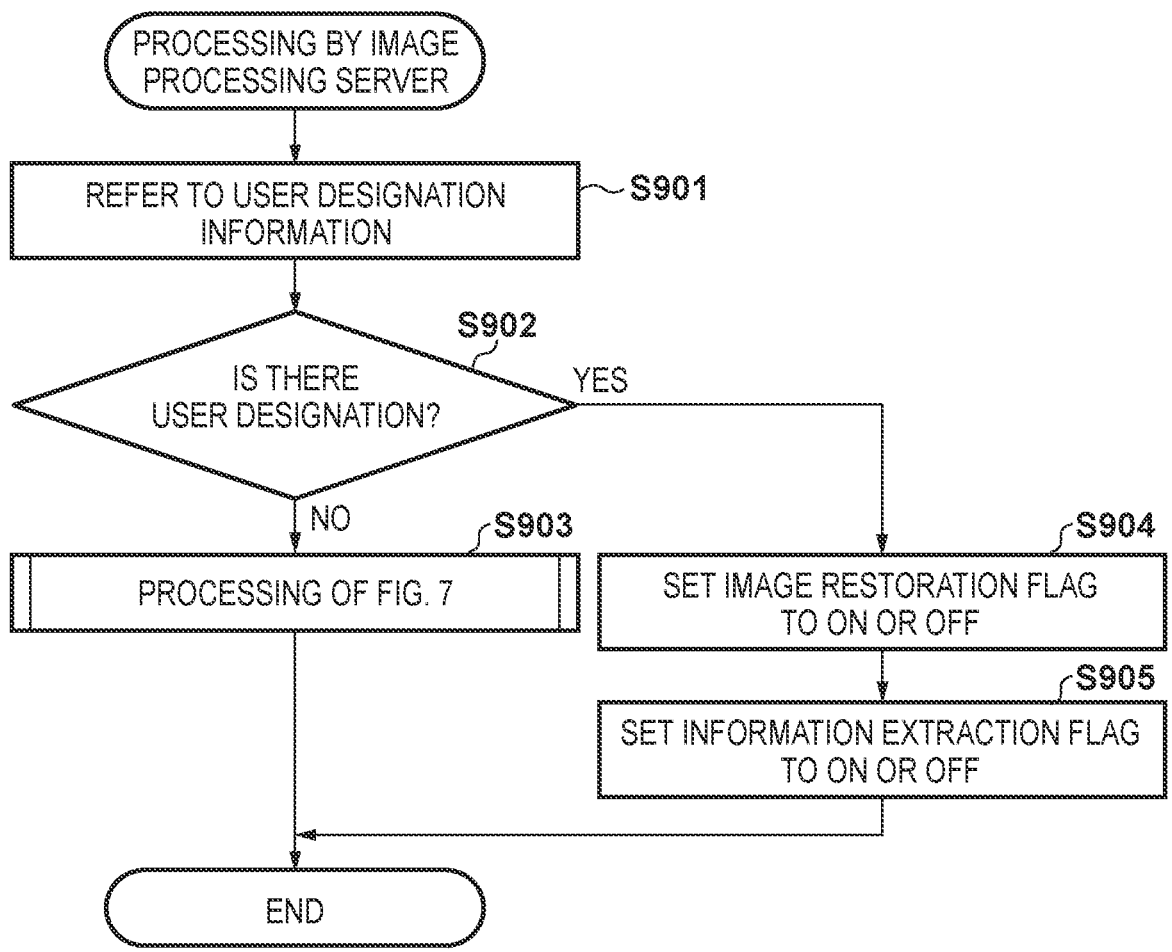
FIG. 9 is a flowchart for explaining a process for processing object determination that is performed by the image processing server according to a third exemplary embodiment when image processing necessity is explicitly set by a user.

FIG. 9 is a flowchart for explaining the processing of the processing object determination by the image processing server 103 according to the third exemplary embodiment in the case where the necessity of image processing is explicitly set by the user, such as the image output setting and the OCR output setting illustrated in FIGS. 11A to 11F. Note that FIG. 9 corresponds to FIG. 7 of the above-described first exemplary embodiment, and the steps S701 to S709 in FIG. 7 correspond to the step S903 in FIG. 9.

In step S901, the CPU 261 refers to the necessity setting information related to image processing of image restoration and information extraction by user designation described with reference to FIGS. 11A to 11F. Next, the process proceeds to step S902, where the CPU 261 determines whether user designation has been made in step S901. Here, when the CPU 261 determines that the user designation has been made, the process proceeds to step S904, and when it determines that the user designation has not been made, the process proceeds to step S903. In step S903, the CPU 261 executes the process object determination described with reference to FIG. 7, and ends the processing.

On the other hand, when the CPU 261 determines that the user designation has been made in step S902, the process proceeds to step S904, and the CPU 261 sets the image restoration flag to ON or OFF based on the necessity setting information related to the image restoration referred to in step S901. Then, the process proceeds to step S905, and the CPU 261 sets the information extraction flag to ON or OFF based on the necessity setting information related to the information extraction referred to in step S901, and ends the processing.

As described above, according to the third exemplary embodiment, it is possible to efficiently output a sufficient image and text based on an image (deteriorated image of received document image data or restored image) or text that the user wants to actually use in the form workflow.

Other Embodiments

Embodiments of the present invention can also be realized by a computer of a system or apparatus that reads out and executes computer executable instructions (e.g., one or more programs) recorded on a storage medium (which may also be referred to more fully as a bon-transitory computer-readable storage medium)] to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)□), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-127890, filed Jul. 9, 2019, which is hereby incorporated by reference herein in its entirety.

What is claimed is:

1. An image processing system, comprising:
   a first image processing apparatus; and
   a second image processing apparatus,
   wherein the first image processing apparatus includes:
      at least one first memory that stores a first program; and
      at least one first processor that executes the first program to perform:
         obtaining image data; and
         transmitting, to the second image processing apparatus, the obtained image data and information relating to the obtained image data, and
   wherein the second image processing apparatus includes:
      at least one second memory that stores a second program; and
      at least one second processor that executes the second program to perform:
         receiving the transmitted image data and the transmitted information relating to the image data;
         setting, as settings, necessity of whether to extract character information contained in the image data and to restore the image data;
         executing image processing on the received image data, based on the settings and the received information; and
         storing a result of the execution of the image processing.

2. The image processing system according to claim 1, wherein
   the first image processing apparatus obtains the image data by scanning an original or receiving a facsimile.

3. The image processing system according to claim 2, wherein
   the information relating to the image data includes at least one of a resolution of the image data, a compression method, and in the case of the image data obtained by receiving the facsimile, a reception date and time, a facsimile number, or in the case of the image data obtained by scanning the original, a scan date and time, identification information of a user of the first image processing apparatus, and identification information of the first image processing apparatus.

4. The image processing system according to claim 2, wherein,
   the image processing corresponding to the settings is executed on the received image data when the information relating to the image data satisfies a predetermined condition, and
   wherein, if the information includes a facsimile number, the image processing is executed according to whether the facsimile number satisfies the predetermined condition.

5. The image processing system according to claim 2, wherein,
   the image processing corresponding to the settings is executed on the received image data when the information relating to the image data satisfies a predetermined condition, and
   wherein, if the information includes identification information of a user of the first image processing apparatus or identification information of the first image processing apparatus, the image processing is executed according to whether the identification information is set as the predetermined condition.

6. The image processing system according to claim 1, wherein
   the image processing includes at least one of extraction of character information included in the image data and restoration from the image data to original image data.

7. The image processing system according to claim 1, wherein
   the image processing includes a process for restoring the image data based on a learning model, and
   wherein the learning model is generated and/or updated based on learning data including an input image as a deteriorated image and a correct image as an original image.

8. The image processing system according to claim 7, wherein
   the image processing further includes character recognition processing on original image data restored from the image data.

9. The image processing system according to claim 1, wherein
   the image processing is executed on image data of a predetermined area in the image data.

10. The image processing system according to claim 1, wherein
    the image processing corresponding to the settings is executed on the received image data when the information relating to the image data satisfies a predetermined condition.

11. An image processing apparatus, comprising:
    at least one memory that stores a program; and
    at least one processor that executes the program to perform:
       obtaining image data and information relating to the image data;
       setting, as settings, necessity of whether to extract character information contained in the image data and to restore the image data;
       executing image processing on the image data, based on the settings and the information; and
       storing a result of the execution of the image processing.

12. The image processing apparatus according to claim 11, wherein,
    when the information includes a facsimile number, the image processing is executed according to whether the facsimile number satisfies a predetermined condition.

13. The image processing apparatus according to claim 11, wherein,
    when the information includes identification information of a user, the image processing is executed according to whether the identification information is set as a predetermined condition.

14. The image processing apparatus according to claim 11, wherein
    the image processing includes a process for restoring the image data based on a learning model, and wherein the learning model is generated and/or updated based on learning data including an input image as a deteriorated image and a correct image as an original image.

15. A method of controlling an image processing apparatus, the method comprising:
   obtaining image data and information relating to the image data;
   setting, as settings, necessity of whether to extract character information contained in the image data and to restore the image data;
   executing image processing on the image data, based on the settings and the information; and
   storing a result of the execution of the image processing.

16. A non-transitory computer-readable storage medium storing a program for causing a processor to execute a method of controlling an image processing apparatus, the method comprising:
   obtaining image data and information relating to the image data;
   setting, as settings, necessity of whether to extract character information contained in the image data and to restore the image data;
   executing image processing on the image data, based on the settings and the information; and
   storing a result of the execution of the image processing.

* * * * *